United States Patent Office 3,429,806
Patented Feb. 25, 1969

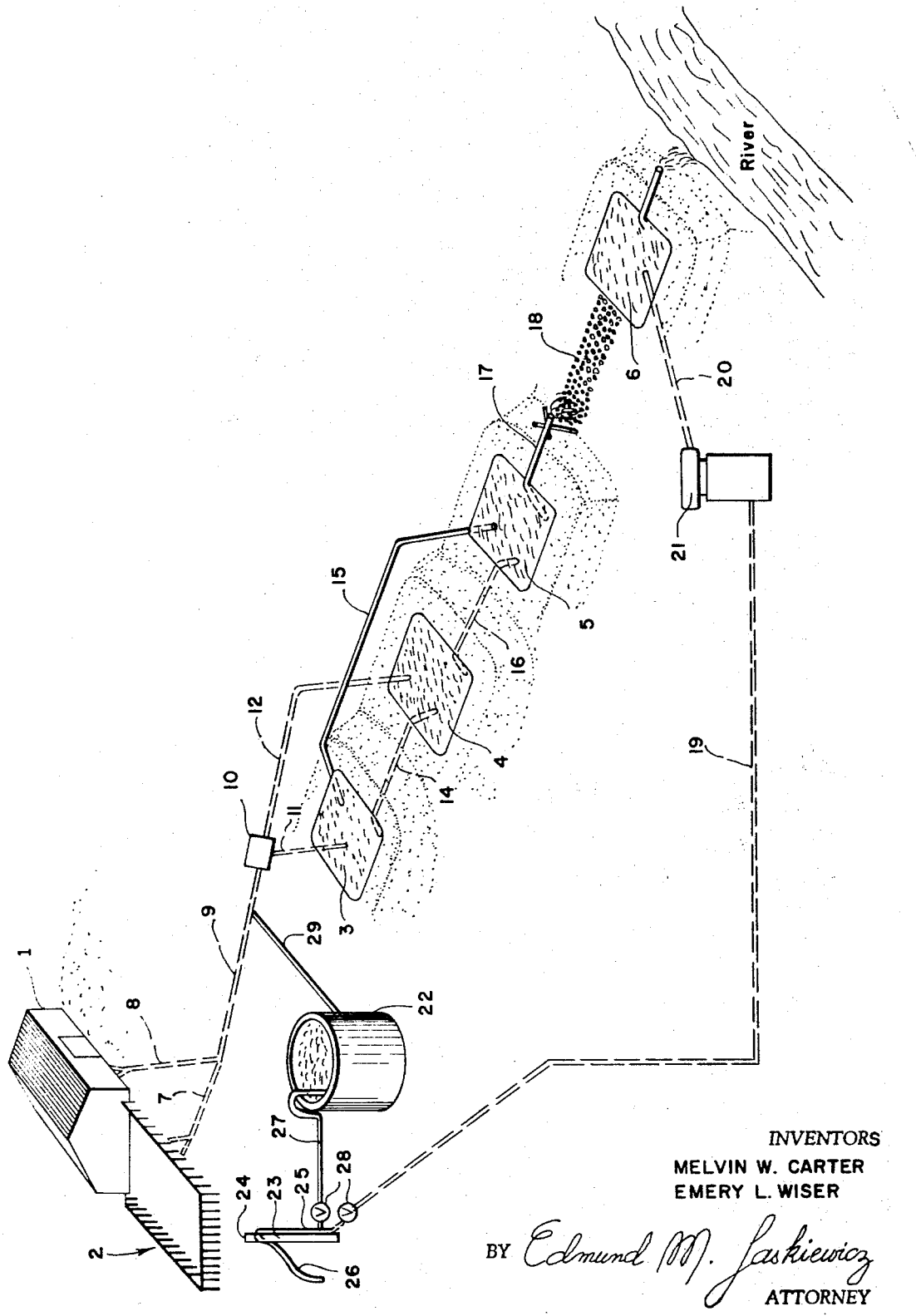

3,429,806
SEWAGE DISPOSAL PROCESS AND SYSTEM FOR MEAT PACKING WASTES
Melvin W. Carter and Emery L. Wiser, both of Rte. 4, Buhl, Idaho 83316
Filed Mar. 24, 1967, Ser. No. 625,705
U.S. Cl. 210—3      12 Claims
Int. Cl. C02c 1/10, 1/02, 5/10

ABSTRACT OF THE DISCLOSURE

A process and arrangement for the decomposition of meat packing wastes by flowing the wastes through a series of stabilization ponds and an aeration pond with the contents of the aeration pond being recirculated back through the stabilization ponds and the overflow from the aeration pond being discharged into a stream. The recirculated contents of the aeration pond constitute a soil conditioner.

---

The present invention relates to a sewage disposal process, more particularly, to a process and arrangement for treating meat packing wastes including blood by a series of stabilization ponds and recirculation of the contents of the last pond so that the effluent from the last pond can be discharged into a stream.

In packing house operations involving the slaughter of large numbers of animals, the disposition of the packing house wastes presents a considerable problem. This waste material results from cleaning the carcasses after the slaughtering operation and washing the manure from the packing house and corrals. The waste material generally comprises paunch material, blood, and animal manure. All of this waste material is washed out of the packing house with a considerable quantity of water and generally dumped into a stream or river, if available, or disposed of through some other suitable process.

Dumping packing house waste material into a river or a stream will eventually produce a high degree of pollution in the stream. Further, various governmental authorities are establishing and enforcing standards for sewage and waste material dumped into streams so as to prevent or at least considerably decrease the pollution of the streams.

One of the requirements for cleaning up the packing house waste materials before they could be dumped into a stream was to remove the blood from the waste. However, the removal of blood from such waste materials by a separate process would be rather expensive and would add considerably to the costs of operating a packing house. Previous sewage disposal processes utilized for treating packing house waste materials did not adequately remove the blood unless during the process the blood was pulled from the waste materials and disposed of separately.

It is therefore the principal object of the present invention to provide a novel and improved sewage disposal process and arrangement for meat packing waste materials.

It is another object of the present invention to provide a sewage disposal process and arrangement for meat packing wastes which effectively treats the waste materials without the necessity for pulling the blood from the waste and disposing of it separately.

It is a further object of the present invention to provide a sewage disposal arrangement and process which can be effectively employed for disposing of the wastes of a large variety of industrial processing plants and city sewage systems.

It is an additional object of the present invention to provide a novel and improved process for producing a soil conditioner from meat packing and other wastes.

According to the sewage disposal process of the present invention, the meat packing waste materials are discharged into a primary stabilization pond where they are retained over a period of time. The wastes are then flowed into a secondary stabilization pond where they are similarly retained for a period of time which may be shorter than for the primary pond. The waste materials are then flowed to a third pond which is rather shallow in depth so as to subject the waste materials to an aeration process. The contents of the third or aeration pond are continuously recirculated back to the first pond and are again passed through the series of ponds as described above. The overflow from the third pond may be discharged into a stream or disposed of in some suitable manner.

It has been found that the contents of the third pond which is an odorless liquid, light green in color, may be effectively used as a soil conditioner and when combined with suitable chemicals may be used as a fertilizer. Thus, the recirculated contents of the third pond may be pumped into a storage tank prior to being flowed into the first pond. From the storage tank, the contents may be withdrawn as desired for use as a soil fertilizer.

The arrangement according to the present invention essentially comprises a plurality of stabilization ponds connected in series with the contents of the last pond being recirculated to the first pond. An overflow discharge is provided from the last pond and the effluent from the last pond may be discharged into a stream. A pair of primary stabilization ponds connected in parallel to the source of packing house waste materials may be employed. In this arrangement the waste materials are directed to one primary pond for a period of time and then to the second primary pond for a similar period of time. In this way the waste materials in the bypassed primary pond may settle according to the usual function of said settling or stabilization ponds. The contents of either primary pond may be selectively flowed to the secondary stabilization pond.

Other objects and advantages of the present invention will be apparent when taken in conjunction with the accompanying description and the following drawings wherein;

The figure is an overall pictorial representation of the sewage disposal system according to the present invention.

As may be seen in the figure a packing house indicated at 1 has an adjoining corral 2 in which the animals are herded and retained until the slaughtering operation. The sewage disposal arrangement according to the present invention comprises four stabilization ponds 3, 4, 5, and 6, preferably at progressively lower levels to facilitate the flow between the ponds.

Ponds 3 and 4 are primary stabilization ponds and each has a capacity of approximately 165,000 gallons. The diameter of each of ponds 3 and 4 is approximately 70 feet, the average depth of about 6 feet and the maximum depth about 9 feet.

Pond 5 is a secondary stabilization pond and has approximately the same capacity and dimensions as ponds 3 and 4.

Pond 6 is an aeration pond and has an area of about 60,000 square feet and a depth of about 4 feet.

Pipe lines 7 and 8 are provided to remove the waste materials from the corral and packing house respectively. The lines 7 and 8 lead into waste line 9 which connects to a diversion box 10. Diversion box 10 has pipe lines 11 and 12 leading therefrom to primary ponds 3 and 4, respectively. The diversion box is provided with suitable valve means for directing the flow of waste to either of primary ponds 3 or 4.

There is an overflow pipe line connection 14 between ponds 3 and 4 with both ends being submerged midway into the ponds to avoid clogging.

Pond 3 is connected to secondary pond 5 by a pipe line 15 which bypasses pond 4. In a similar manner, pond 4 is connected directly to pond 5 by a line 16.

The contents of pond 5 are flowed to pond 6 through a pipe line 17 which excretes the contents onto a splash plate 18 formed of rocks or concrete. The waste material flows over splash plate 18 into aeration pond 6.

In order to recirculate the contents of pond 6, a recirculation line 19 is provided having its intake 20 located at such a point in the pond so as to avoid running the pump dry and to avoid any trash problems at the intake. A recirculating pump 21 having a capacity of about 40 gallons per minute is located in line 20 and pumps the contents into a storage tank 22 which has a capacity of about 4800 gallons. The recirculation line 19 has a diameter of about 1½ inches.

The recirculation line 19 may lead to a loading tower 23 which may consist of a vertical post 24 having a pipe line or hose 25 attached thereto with a free or discharge end 26 for loading the contents directly into a truck for a purpose as will be later described.

A line 27 is provided between the loading tower 23 and the storage tank with valves 28 for flowing the recirculated contents into the storage tank. The storage tank is provided with an overflow line 29 connected to waste line 9 so that the overflow contents of the storage tank are flowed directly into the line 9 and are processed again through the stabilization ponds.

The recirculation pump 21 may be positioned at any convenient location in recirculation line 19 and is in continuous operation.

In the waste decomposition process according to the present invention, initially the packing house wastes and the animal manure are washed down with considerable quantities of water through the respective lines to the diversion box. For each 24-hour period, the waste material comprises approximately 2500 lbs. of blood, 8000 lbs. of paunch material, 2800 lbs. of animal manure and 15,000 gallons of water.

At the diversion box the waste material is flowed directly to either of the primary stabilization ponds. The retention time in these ponds is approximately 10 days. In the preferred operation of the present process, the waste material from the packing plant is directed to one of the two primary ponds for 10 days and then directed to the other primary pond for a corresponding 10 day period. It is pointed out that with this bypass method of operation the retention time in the primary ponds can be controlled.

The waste material contents of either of the primary ponds 3 or 4 is then flowed through the respective line to the secondary stabilization or settling pond 5. The retention time of the material in this secondary pond is about half of the retention time of the primary ponds or about 5 days. This third pond in the series of ponds becomes a secondary pond and provides for a continuation of the decomposition process already begun in the primary ponds. The material from the secondary pond is putrid to smell and dark in color. The material is excreted onto a splash plate made of rocks or concrete and flowed over the rocks for aeration into the large open fourth pond which may be termed an aerobic pond. Aeration is the prime consideration of this fourth pond. Nearly all of the anaerobic bacteria die as they become exposed to the oxygen and the process is completely by the aerobic bacteria and organisms.

The contents of the fourth or aerobic pond are then recirculated to the storage tank. This recirculated material has a light green color as the result of algae growth and is absolutely without odor. The overflow from this storage tank is passed to the diversion box and is again subjected to the treatment of passing through the ponds as described above.

The recirculation of the contents of the fourth pond is carried out continuously to assure aerobic as well as anaerobic activity for faster breakdown of the organic materials and to allow the contents of the storage tank to be loaded into tank trucks at convenient locations.

The overflow from the aerobic or fourth pond is then discharged into an available stream or river. Tests have shown that this effluent has BOD of around 80 or less which is pure enough to drink.

By way of comparison, the following are the results of tests on the contents entering and leaving the aerobic pond with the effluent being tested both without recirculation and with recirculation according to the present invention.

|  | Without recirculation | | With recirculation, aerobic pond |
|---|---|---|---|
|  | Inlet aerobic pond | Outlet aerobic pond |  |
| COD, p.p.m. | 815 | 512 | 346 |
| BOD, p.p.m. | 565 | 375 | 90 |
| Nitrogen total, p.p.m. | 87 | 92 | 100 |
| Phosphorus total, p.p.m. | 4.2 | 4.2 | 0.80 |

With respect to the surface conditions of the various settling ponds, the primary ponds 3 and 4 will have a thin scum or cake on its surface but always in a liquid condition. This thin cake will not hold the weight of a small stone. There is no odor at all.

The surface of the secondary pond 5 is always liquid and working continuously.

The fourth or aerobic pond has an abundant supply of green algae indicating that there is a proper balance in digestion.

The essential purpose of the settling ponds according to the present invention is to provide an environment for the various types of organisms necessary for the decomposition of organic material. Once this is done, the most desirable organisms for the task are supplied on a continuing basis along with the organic material to be digested.

It is pointed out that the use of settling or stabilization ponds without the recirculation as disclosed in the present invention results in a slow, incomplete and putrid system of decomposition of waste materials. Decomposition in the absence of sufficient oxygen or anaerobic conditions is brought about by entirely different organisms from those that function under aerobic conditions and the chemical changes produced are not the same. The rate of decomposition is much slower and the chemical changes are less complete. As a result, there is an accumulation of solid materials on the surfaces of the anaerobic ponds which do not breakdown. The system eventually becomes plugged and requires cleaning with dragline or the like. Further, two years were normally required before the ponds become resealed to the extent that odors are bearable. These conditions greatly augmented the control problem of air and stream pollution.

According to the process of the present invention, this condition no longer exists. New ponds can be dug and waste material is absolutely odorless from the first few days of operation. The amounts of organic waste materials that can be digested through this process are significantly increased. An important feature of the present process is the completeness of the breakdown. As pointed out above, there has been no buildup of a crust on the surfaces of any of the ponds. This means that these ponds will function indefinitely without the necessity for any cleaning operations.

It is therefore apparent that an important feature of the present process is the recirculation of a complex biochemical solution from the fourth pond back through the system for the purpose as outlined above.

Visual and laboratory reports on the operation of the disclosed waste treatment arrangement are all positive. The effluent is colorless and odorless; there are no pathogenic or enteric bacteria in the solution; and the process is aerobic in the final pond. There is an active green algae and diatom colony in the pond which is the final indication that the system is maintaining a balance of nitrogen, phosphate, protein, amino acids and enzymic compounds to enhance the bacterial, and therefore, the plant life of the cultures in the pond.

When the packing house wastes are decomposed in the manner as described above, the recirculated contents of the fourth pond, which are pumped to the storage tank, may be used as a soil conditioner. The storage tank contents is a light green liquid having virtually no settleable solids therein and suspended solids are at a minimum. The test of the effluent as described above showed that settleable solids had 0 p.p.m. and the suspended solids were 148 p.p.m. The storage tank contents can be pumped into a truck and combined wtih chemicals to form a fertilizer.

The composition of the recirculated contents of the fourth pond, by laboratory analysis, includes a single-cell specie of algae in abundance. This is an excellent source of amino acids. The green color of the algae is also a simple and useful indicator as to the chemical condition of the contents of the aerobic pond. In addition, many species of bacteria are found. The myxobacteria prevails in the culture. This is of particular interest because of the activity of certain types of myxobacteria in the initial phases of the formation of humus. Along with fungi, the myxobacteria are active in breaking down cellulose. Further, there are at least four different species of protozoa found in abundance.

There is also found a trace of every element necessary to plant growth. Though in minute quantities, these elements provide food for the bacteria while in transit to the soil where they serve as a catalyst to the existing soil mechanisms. The biological activity of the soil is stimulated by the addition of this material in much the same way that animal manure stimulates the biological activity of the soil. As a result there occurs a faster breakdown of crop residues in the soil releasing to the plant the elements contained therein. The improved soil structure enables the soil to take water better and hold it longer. It has been recently theorized that animal manures have a value over and above the chemical elements they contain. It has been shown in a series of recent tests that animal manures not only contain phosphorous but for some reason or other they increase the availability of any phosphorous already present in the soil.

Thus it can be seen that the present invention discloses a process and arrangement for the effective decomposition of meat packing waste materials. There is also disclosed a process for producing a liquid soil conditioner from meat packing waste materials and wastes from other industrial processes. The effectiveness of the present process is achieved by the recirculation of the biochemical solution from the fourth pond back through the system of ponds. This recirculation greatly increases the digestion of the pond contents to the point where the overflow discharge from the fourth pond has a BOD of 80 or less.

The disclosed process and system biologically decomposes all products from the slaughtering process to result in an end product, or final effluent, which is colorless, odorless, low in solids and organic compounds. This end product contains the soluble and conjugated mineral and protein compounds in a form that is readily available to plants. These available compounds are essential to activate, through energy and nutrients, the populations of microbes that aid and regulate the life of the growing plant. The addition of certain inorganic but soluble chemicals to this final effluent will supplement the microbes and enable the population of microbes to continue their increase. This activity will improve the soil condition as well as feed and release nutrients to the growing plants.

The improvement of the soil coupled with the resulted increase in yield and quality using the soil conditioner according to the present invention has been shown to be economically feasible.

It is understood that this invention is susceptible to modifications in order to adapt it to different usages and conditions, and accordingly, it is desired to comprehend such modifications within this invention as may fall within the scope of the appended claims.

What is claimed is:

1. In a sewage disposal process for meat packing and other wastes, the steps comprising discharging the waste materials into a primary stabilization pond for retention therein over a predetermined period of time, flowing the waste materials from said primary stabilization pond to a secondary stabilization pond, flowing the waste materials to a third pond for aeration, the waste materials from said second stabilization pond being flowed onto an elongated ground level flow path extending between the secondary and third ponds before entering the third pond, recirculating the contents of the third pond back to the primary stabilization pond to reflow the recirculated contents through the ponds, and discharging the overflow from the third pond.

2. In a sewage disposal process for meat packing and other wastes, the steps comprising discharging the waste materials into a primary stabilization pond for retention therein over a predetermined period of time, flowing the waste materials from said primary stabilization pond to a secondary stabilization pond, flowing the waste materials to a third pond for aeration, recirculating the contents of the third pond back to the primary stabilization pond to reflow the recirculated contents through the ponds, and discharging the overflow from the third pond, the recirculated contents from the third pond being first flowed to a storage tank and then to the primary stabilization pond.

3. In a sewage disposal process as claimed in claim 2 wherein the waste materials are retained in the secondary stabilization pond for a predetemined period of time.

4. In a sewage disposal process as claimed in claim 2 wherein the waste materials are discharged into a first primary stabilization pond for a period of time and then to a second primary stabilization pond for a period of time, and flowing the waste from one of said two primary stabilization ponds to said secondary stabilization pond.

5. In a sewage disposal process as claimed in claim 2 wherein said recirculation is continuous.

6. In a sewage disposal process as claimed in claim 2 wherein the overflow of the storage tank is flowed to the primary stabilization pond.

7. In a sewage disposal process as claimed in claim 2 wherein in the waste materials are flowed constantly through the secondary stabilization pond.

8. In a sewage disposal system for meat packing and other waste materials, the combination of a primary stabilization pond for receiving the waste materials from a source and retaining the waste materials therein for a predetermined period of time, a secondary stabilization pond connected to said primary pond to receive waste materials therefrom, a third pond connected to said secondary stabilization pond to receive waste materials therefrom, there being overflow discharge means from said third pond, and means interconnecting said third and first ponds for recirculating the contents of said third pond to said first pond, said recirculating means including a storage tank connected between said third pond and the source of waste products.

9. In a sewage disposal system as claimed in claim 8 wherein said recirculation means are continuous.

10. In a sewage disposal system as claimed in claim 8 and further comprising an elongated ground level flow path extending between said second and third ponds to aerate the waste materials flowing from said second pond to said third pond.

11. In a sewage disposal system as claimed in claim 8 with there being first and second secondary stabilization ponds for selectively receiving the waste materials from a source, and means for flowing selectively the waste materials to one of said primary stabilization ponds.

12. In a sewage disposal system as claimed in claim 8 and further comprising means for flowing the waste materials from said one primary stabilization pond to said secondary stabilization pond and bypassing the other primary stabilization pond.

References Cited

UNITED STATES PATENTS 3,234,123   2/1966   Hinde _____ 210—14 X

OTHER REFERENCES

Steffen, A. J.: Stabilization Ponds for Meat Packing Wastes, Journal WPCF, April 1963, vol. 35, pp. 440–444.

Oswald, W. J.: Fundamental Factors in Stabilization Pond Design, appearing in Advances in Biological Waste Treatment, edited by W. W. Eckenfelder et al., Macmillan Co., New York, 1963, pp. 358 and 382–393 relied on.

MICHAEL E. ROGERS, *Primary Examiner.*

U.S. Cl. X.R.

210—9, 16, 195; 71—15